Sept. 2, 1958        T. KASUGA        2,850,610
CONDUCTIVE HEATER CONTROL SYSTEM
Filed Aug. 16, 1955        2 Sheets-Sheet 1
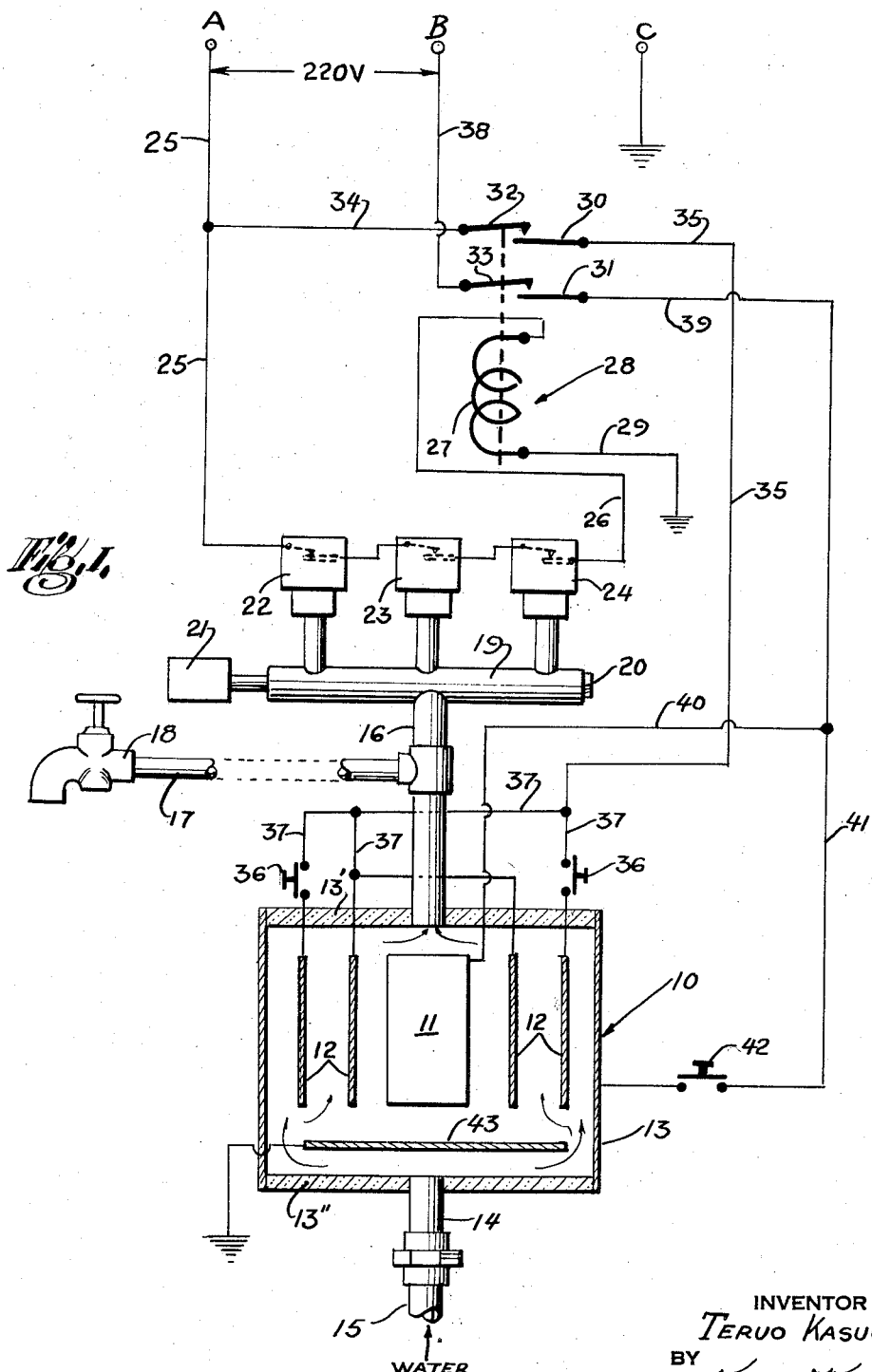
INVENTOR
TERUO KASUGA
BY
Kenyon & Kenyon
ATTORNEYS

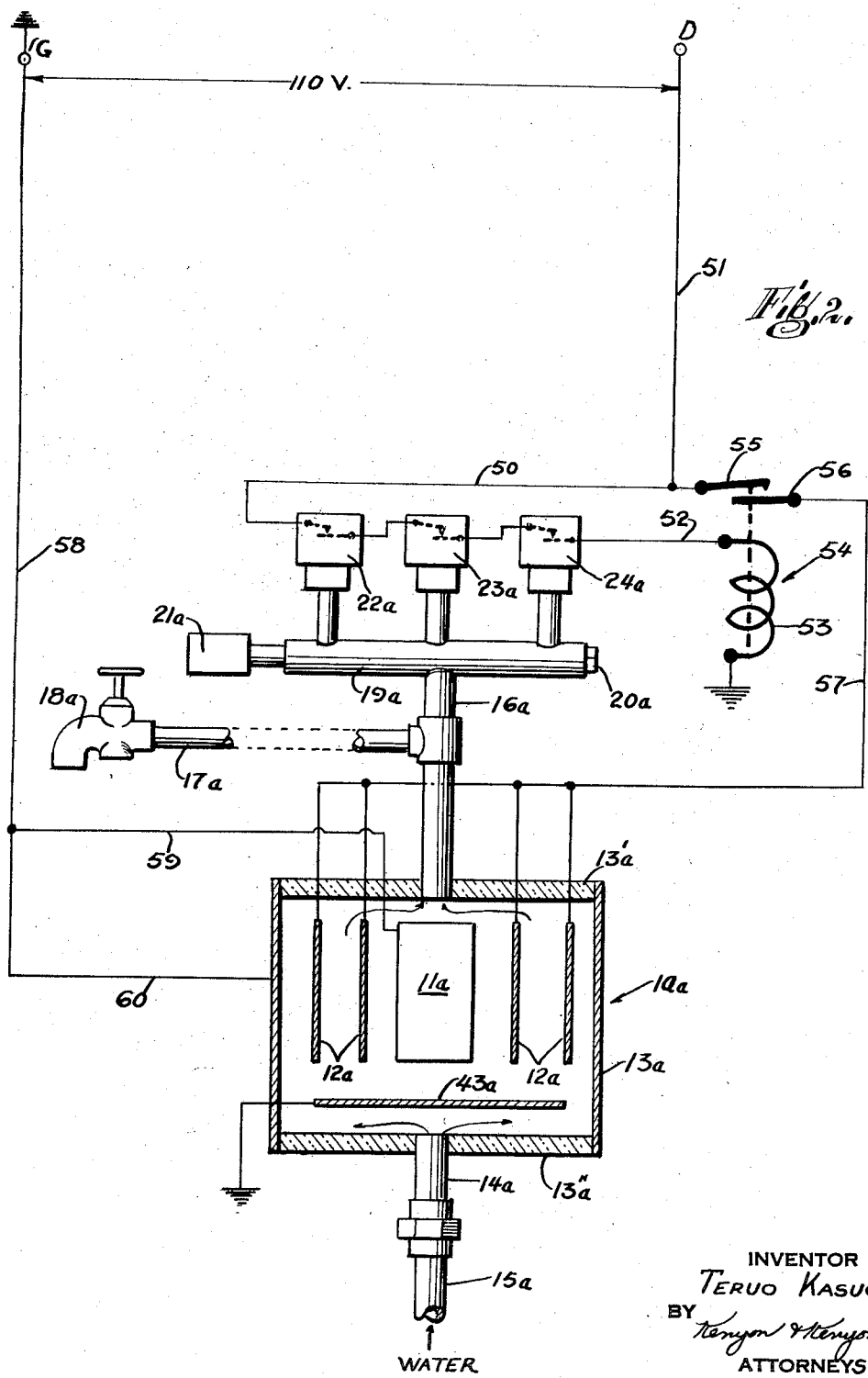

United States Patent Office 2,850,610
Patented Sept. 2, 1958

2,850,610

CONDUCTIVE HEATER CONTROL SYSTEM

Teruo Kasuga, New York, N. Y., assignor, by mesne assignments, to Carbon Heater Corporation, New York, N. Y., a corporation of New York Application August 16, 1955, Serial No. 528,596

1 Claim. (Cl. 219—20)

This invention relates to electric water heating arrangements and more particularly to a control system for providing safe and automatic operation of the heater.

Electric conduction type water heaters are currently being used with vending machines for dispensing heated fluids such as coffee, tea or other hot liquid beverages or foods. The heaters of these machines are designed to heat cold water rapidly to the required brewing temperatures for coffee, tea, other hot beverage or the like. Since the machines are left unattended usually for comparatively large parts of their operating times, it is imperative that their operation be completely automatic and entirely safe.

Objects and features of this invention are the provision of simple and safe operating and control systems for electric conduction type water heaters of the type mentioned.

The electric conduction water heaters in use include spaced apart electrodes usually of carbon or graphite in a closed container. Water is admitted to the container at a controlled rate and enters the spaces between electrodes. When an electric current is caused to flow through the water between the electrodes, the resistance of the water causes its heating. Regulation of current flow, of rate of water flow as well as the mineral content of the water, i. e., its degree of hardness or softness, all are contributing factors which affect the speed and extent of water heating effected. It is possible by controlled adjustment of the variables to regulate the speed and extent of water heating within practical limits so that when the heater is set up for operation heated water within a desirable temperature range is made available quickly merely by opening the water tap or faucet.

However, water line pressure from the main is a variable over which no simple automatic control usually is available. It may vary considerably between widely separated high and low values. Any variation in line pressure will affect the rate of flow of water through the heater when the tap is open and, in consequence, affect the temperature of the outflowing water. If pressure is too low water flow will be slowed and excessive heating may occur. If too high a pressure exists the increased rate of water flow will result in lowering of the water temperature below that desired for brewing purposes. Moreover, safe operation requires a limitation of the water heating to a reasonable temperature range.

Objects and features of the invention are the provision of automatic controls in the electrical system which are responsive to changes in water pressure and water temperature to control the flow of electric heating current through the water.

Further objects and features of the invention are the provision of a system in which water heating electric current flow will be initiated automatically by opening of the water tap or faucet and automatically discontinued upon closing of the tap.

Other objects and features of the invention will become apparent from the following specification and the accompanying drawings, wherein:

Fig. 1 is a diagrammatic showing of the water heater control system adapted for operation with a three wire electric power supply; and Fig. 2 is a similar showing adapted for operation with a two wire electric power supply.

Referring to the drawing and first to Fig. 1, the reference character 10 denotes generally an electric water heater of the conduction type. In the embodiment shown the heater 10 includes a core electrode 11 and additional separate electrodes 12 spaced from each other and from the core electrode 11. These electrodes are of materials commonly used in heaters of the type in question being, for example, of carbon or graphite. All the electrodes are positioned within an enclosing shell or casing 13 preferably of metal such as copper, brass or the like, whose upper and lower end closures 13' and 13" are preferably of insulative material. The electrodes are insulated electrically from each other and the casing in usual ways.

In the embodiment shown in Fig. 1, an inlet 14 for water is provided at the bottom of the casing 13, this inlet being connected to a conventional water supply pipe 15. An outlet flow pipe 16 is provided at the upper end of the container 13. A water delivery pipe 17 controlled, for example, by a conventional spigot, tap or faucet 18 is connected to the outlet pipe 16.

A header 19 is also connected to the outlet flow pipe 16. This header 19 is closed off at one end as by a plug 20. A blow-off safety valve 21 of conventional type is mounted conveniently at the other end of header 19.

A pair of independently adjustable pressure responsive switches 22 and 23 of conventional types and a conventional adjustable temperature responsive or thermostatic switch 24 are mounted in the header 19. Pressure responsive switches 22 and 23 are repsonsive to fluid pressures in header 19. The temperature responsive switch 24 is responsive to water temperatures in header 19. The pressure responsive switches 22 and 23 and the temperature responsive switch 24 are all of single pole single throw type switches and their contacts are connected in electrical series for purposes presently to be described.

The water pressure at the supply line under usual operating conditions is in the neighborhood of 15 p. s. i. Pressure responsive switch 22 is adjusted so that its contacts are open at all pressures in the header 19 above approximately from 9–11 p. s. i. Pressure responsive switch 23 is a so-called low pressure cut-out switch. It is adjusted so that its contacts will be open at all pressures in the header 19 below approximately 5 p. s. i. and will be closed at pressures above such value. The thermostatic switch 24 normally has its contacts closed and it is adjusted so that these contacts will open at water temperatures in the header above a limiting value, for example, approximately 175° F.

The three serially connected switches 22, 23, 24 are connected by wire 25 to power wire A of a three wire supply line and by wire 26 to one terminal of the operating solenoid coil 27 of a power relay 28. The other terminal of coil 27 is grounded via wire 29. In order, therefore, to provide energizing current flow through coil 27, all three serially connected switches 22, 23 and 24 must be closed. Opening of any one of them will de-energize coil 27. When coil 27 is energized it operates the power relay 28 to circuit closing condition. When de-energized it permits restoration of relay 28 to circuit opening condition. The power relay 28 is of the double pole single throw type including a pair of fixed contacts 30 and 31 and a pair of movable contacts 32 and 33 which are normally separated from the respective fixed contacts 30 and 31 and movable into circuit closing condition respectively therewith by the energization of solenoid operating coil 27.

Wire 34 is connected to power wire A via wire 25 and also to movable contact 32. Fixed contact 30 associated with movable contact 32 is connected by wire 35 to the parallelly interconnected separate electrodes 12 via interconnection wires 37. Suitable manually operable series switches 36 in selected ones of the parallel interconnection wires 37 for the electrodes 12 enable the operator to cut out various of the electrodes 12 at will and thus vary the heating electric current flowing in water admitted to the jacket 13.

A wire 38 connects the power wire B of the three wire power line to the movable contact 33 of the power relay 28. The associated fixed contact 31 of said relay is connected by wires 39 and 40 to the core electrode 11 and also by wire 41 to casing 13 through a manual series switch 42.

A grounding plate 43 is positioned internally of the casing 13 to distribute the flow of water entering said casing through the entire volume thereof and to maintain the water at ground potential. For safety to casing 13 is completely enclosed in a cabinet so that accidental personal contact with casing 13 is prevented.

The operation of this arrangement is as follows:

As long as tap, spigot or faucet 18 is closed and pressure of water in the supply main or pipe 15 is at or above its usual average pressure of, for example, 15 p. s. i., pressure of approximately the same value will be present in the header 19. In consequence, pressure responsive switch 22 which has been adjusted previously to open at pressures above approximately 9–11 lbs. is open. Low pressure responsive switch 23 is closed at this time as is temperature responsive switch 24 if the water temperature is below 175° F. Upon opening of the tap or spigot 18 pressure within the header 19 immediately drops in this instance to a range of from 9–11 p. s. i. This causes switch 22 to close. Since switches 23 and 24 are also closed, energizing current from power line A is then free to flow via wires 25, the three serially connected and now closed switches 22, 23, 24, wire 26 and solenoid coil 27 of power relay 28 to ground wire 29 and grounded power line wire C. Resulting energization of the solenoid coil 27 causes circuit closing movement of the two movable contacts 32 and 33 of power relay 28 relative to their respective fixed contacts 30 and 31. In consequence, heating electric current can flow from power line A via wire 25, wire 34, contacts 32 and 30, wire 35, parallel electrode interconnection wires 37, electrodes 12, the water in heater casing 13, core electrode 11, wire 40, wire 39, power relay contacts 31 and 33 and wire 38 to power wire B. The water is heated by the described electric current flow and flows outwardly of casing 13 through pipes 16 and 17 and open tap 18 for use as desired.

The opening of tap 18 thus initiates water flow through the heater casing and also the flow of electric heating current through the water. If during such flow the temperature of the water rises above the response temperature setting of thermostatic switch 24, in this instance above approximately 175° F., the switch 24 opens. This breaks the series circuit through the three switches 22, 23 and 24 causes de-energization of power relay solenoid coil 27 causing the described relay established circuits through pairs of contacts 32, 30 and 33, 31 to be broken and consequently a cessation of heating current flow through the water. Upon reduction of water temperature to values below the temperature opening setting of thermostatic switch 24, all the circuits are restored to energized condition and heating current again flows through the water as described above.

As soon as tap 18 is closed the internal pressure in heater 13 and in header 19 rise to approximately the water line pressure of 15 p. s. i., thus causing pressure responsive switch 22 to open because it is set to open above 9–11 p. s. i. This again de-energizes all the electric circuits in the same manner as did the opening of thermostatic switch 24 because of the circuit break thereby effected in the three serially connected switches at switch 22 rather than at switch 24.

If, by chance, water line pressure drops from its usual 15 p. s. i. value while tap 18 remains closed to a value of less than 11 p. s. i. switch 22 will automatically close and heating current will flow at least until the water temperature uses to the cut-off or opening temperature of approximately 175° F. of the thermostatic switch 24. Opening of the latter then will prevent any further current flow.

A sudden drop in water main pressure below approximately 5 p. s. i. causes a similar pressure drop in header 19 and automatic opening of the serially connected pressure responsive switch 23. This also prevents heating current flow through the water in the same way as was effected by the opening of pressure switch 22 or of thermostatic switch 24. Heating current is thus prevented from flowing when water main pressure is too low. This is particularly important to prevent waste of electric current when insufficient water supply is available for proper heater operation.

Manual switch 42 provides means to apply potential to the outer casing 13 whenever necessary to increase current flow through the water for heating purposes. This requirement may occur if the water is very soft.

When a two-wire power line is used the circuitry to provide the features of safety of this invention is modified as is illustrated in Fig. 2. In the latter figure all elements bearing the same reference characters used in Fig. 1 with the subscripts $a$ are identical therewith.

The three serially connected switches 22a, 23a and 24a (which correspond respectively with switches 22, 23 and 24) are connected by wire 50 to power wire D of the two-wire supply line via wire 51, and by wire 52 to one terminal of an operating solenoid coil 53 of a power relay 54. The other terminal of the coil 53 is connected to ground via wire 55 and thus to ground wire G of the two-wire power supply line. All three serially connected switches 22a, 23a and 24a like their corresponding switches 22, 23 and 24 must be closed to provide energizing current for the solenoid coil 53 of power relay 54.

The power relay 54 in this modification is a single pole, single throw type including a movable contact 55 and a fixed contact 56 which are normally separated when coil 53 is not energized and which are in circuit closing condition when coil 53 is energized.

Wire 51 from power line D is connected to the contact 55 of the relay 54. Contact 56 thereof is connected by wire 57 to the parallelly interconnected electrodes 12a. The grounded power wire G of the power line is connected as by wire 58, 59 and 60 both to the core electrode 11a and to the jacket 13a.

The operation of the arrangement of Fig. 2 is substantially similar to that of Fig. 1 and is as follows:

With tap 18a closed the water pressure in header 19a is substantially the same as that in the water supply line 15a. In consequence, since this normally is of a value greater than the circuit closing setting (9–11 p. s. i.) of the pressure responsive switch 22a the series circuit through the three switches is broken at switch 22a. Hence solenoid coil 53 is not energized and the power relay contacts 55 and 56 are separated and no electric heating current can flow to the electrodes 11a and 12a from the electric power supply line.

Opening of tap 18a causes the water pressure in header 19a to drop below the circuit closing pressure setting of switch 22a (in this embodiment 9–11 p. s. i. for a 15 p. s. i. pressure in water supply line 15a). Closing of switch 22a completes the series circuit through the three series connected switches 22a, 23a and 24a causing energizing current to flow through the operating solenoid coil 53 of power relay 54. This closes the power circuit at contacts 55 and 56 of the power relay 54 and electric heating current flows through the water between the electrodes 11a and 12a within heater 10a. If the temperature of the water rises above the temperature setting of the thermostatic switch 24a, i. e., above 175° F., for example, the series circuit through the three switches 22a, 23a and 24a is broken at switch 24a with a resultant de-energization of solenoid coil 53 and opening of the power circuit to the electrodes 11a and 12a at relay switch contacts 55 and 56. Upon fall of temperature below the opening temperature setting of thermostatic switch 24a, the solenoid coil is re-energized and the electric heating power circuit to the electrodes 11a and 12a is restored automatically as long as tap 18a remains open. When tap 18a is closed the switch 22a opens automatically because of rise in pressure in header 19a to above the switch opening pressure setting of switch 22a thus again de-energizing solenoid coil 53 of the power relay 54 and restoring the relay 54 to circuit open condition so that no electric power can be transmitted to the electrodes 11a and 12a because of the open circuit at separated contacts 55 and 56 of the power relay.

Again if by chance water pressure drops from its usual 15 p. s. i. value to a value below approximately 5 p. s. i., the serially connected low pressure switch 23a (set to open below 5 p. s. i.) opens causing the de-energization of solenoid coil 53 of the power relay and consequent circuit open condition at power relay contacts 55, 56 thus preventing heating current flow between the electrodes 11a and 12a until water pressure rises at least above the 5 p. s. i. value when switch 23a again closes.

It is seen, therefore, that the arrangements of Fig. 1 and of Fig. 2 provide for safe operation of the water heater because both provide automatic cut off of electric heating power to the electrodes when the tap is closed, or when water temperature during heating rises above a set value or when water pressure falls below a safe value.

The three serially connected control switches are each responsive to one of the factors required for safe and efficient operation. In consequence, heating of water can only be effected if all the safety factors are satisfied.

While specific embodiments of the invention have been disclosed variations in detail within the scope of the appended claim are possible and are contemplated. There is no intention therefore of limitation to the exact details shown and described.

What is claimed is:

A conduction heater control system for connecting the electrodes of an electrical conduction type of heater to an electric power supply source comprising a power relay means operable to circuit closing condition when electrically energized, means for connecting said power relay means between said source and said electrodes to supply electric power thereto when said power relay means is energized, and a group of serially connected electric switches each having open and closed positions, said group of serially connected switches comprising a temperature responsive switch adjusted to open above a predetermined temperature of liquid heated by the heater and to close below said predetermined temperature, a pressure responsive switch adjusted to open above a predetermined pressure within said heater and to close below said pressure, and a second pressure responsive switch adjusted to open below a different predetermined pressure and to close above said last-named pressure.

References Cited in the file of this patent

UNITED STATES PATENTS

| | | |
|---|---|---|
| 1,920,284 | Wells | Aug. 1, 1933 |
| 2,026,596 | Ross | Jan. 7, 1936 |
| 2,229,261 | Stiebel | Jan. 21, 1941 |
| 2,597,063 | Cantanzano | May 20, 1952 |
| 2,680,802 | Bremer et al. | June 8, 1954 |
| 2,682,984 | Melikian et al. | July 6, 1954 |
| 2,706,240 | Hackman | Apr. 12, 1955 |